United States Patent [19]

Allias et al.

[11] 4,179,807
[45] Dec. 25, 1979

[54] HAND TOOL FOR CUTTING AN OPTICAL FIBRE

[75] Inventors: Bernard Allias, Brétigny sur Orge; Charles Decaudin, Vigneux, both of France

[73] Assignee: Compagnie Industrielle des Telecommunications Cit-Alcatel, Paris, France

[21] Appl. No.: 920,895

[22] Filed: Jun. 29, 1978

[30] Foreign Application Priority Data

Jul. 13, 1977 [FR] France .................. 77 21695

[51] Int. Cl.² ............................. B26B 17/02
[52] U.S. Cl. .............................. 30/124; 30/182
[58] Field of Search .......... 30/124, 127, 182, 183, 30/184, 358; 269/237

[56] References Cited

U.S. PATENT DOCUMENTS

| | | | |
|---|---|---|---|
| 2,509,630 | 5/1950 | Duffy | 30/124 |
| 2,925,654 | 2/1960 | Rozmus | 30/124 |
| 4,118,862 | 10/1978 | Hensel | 30/124 |

*Primary Examiner*—Gary L. Smith
*Attorney, Agent, or Firm*—Sughrue, Rothwell, Mion, Zinn and Macpeak

[57] ABSTRACT

The invention relates telecommunications. It concerns in particular the cutting of optical fibre. It provides a hand tool which is generally shaped like pincers whose two legs move apart during operation, the optical fibre being fixed to each of the free ends of the legs which stretch it and press it against a rounded forming part fixed to one of the legs while a knife comes up to the forming part to start breaking the fibre by scoring it, all these operations being controlled by operating a single trigger lever. It applies to the forming of connections at the ends of the optical fibres.

11 Claims, 1 Drawing Figure

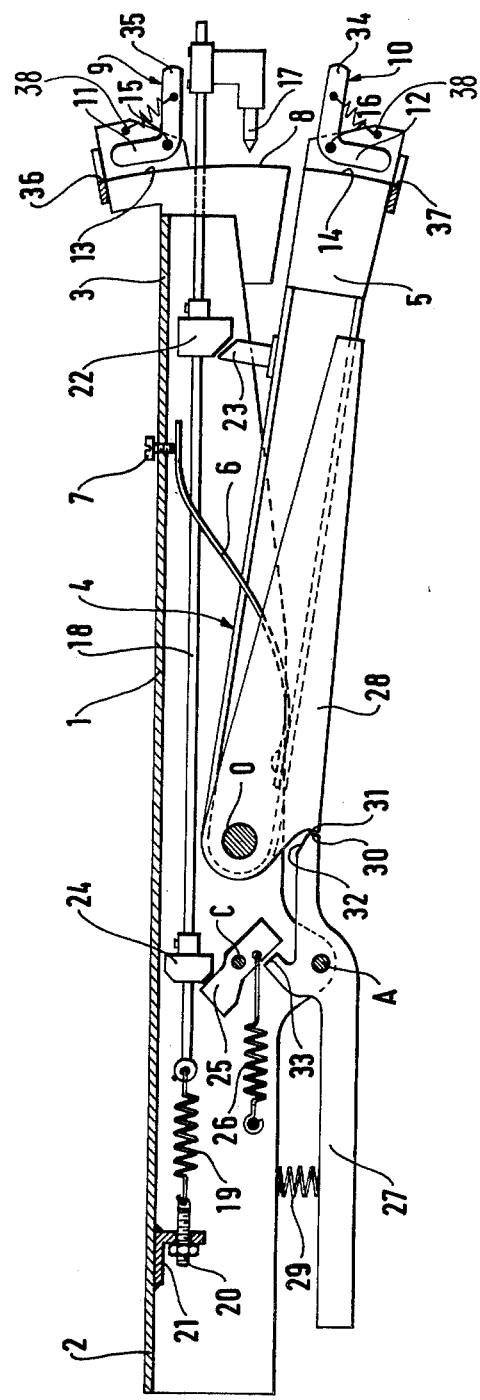

4,179,807

HAND TOOL FOR CUTTING AN OPTICAL FIBRE

FIELD OF THE INVENTION

The invention relates to telecommunications. It concerns optical fibres and in particular the cutting of optical fibres for making connections.

BACKGROUND OF THE INVENTION

For a connection at the end of an optical fibre to cause a minimum amount of loss in light transmission the fibre must end in a plane surface perpendicular to its axis. Such an end can be obtained by various techniques such as swing, grinding and polishing which are difficult to perform in situ outside a laboratory. An end can also be obtained by a break started by a transversal score on the fibre in a zone where it has previously been stretched and bent. But this method, although more simple, is also difficult outside a laboratory, since it requires great accuracy in the tractive forces applied and in the radius of curvature imposed on the fibre as well as in the transversal stress which causes the scoring so that the break will not splinter or leave a lip which makes it unsuitable for forming a connection.

The present invention aims to provide a hand tool for cutting optical fibres which is easy to use in accordance with the above-mentioned method and provides the required accuracy.

It provides a hand tool for cutting an optical fibre comprising two articulated legs which have two free ends at the same distance from their pivot point, and referred to as the first ends, said ends being close together in a rest position and moving apart when the tool is operated.

Further, a support forming part for bending the optical fibre has a convex profile and is installed at the first end of one of the legs so that its convex surface is perpendicular to the plane of the two legs and faces away from the pivot point of these legs.

Two clips (one per arm) are installed on either side of the forming part in the extension of the convex profile thereof, each on the first end of the corresponding leg; said clips grinding the optical fibre on either side of the forming part.

A moveable knife is disposed on the first end of one of the legs, facing the convex profile of the forming part and extending thereacross.

First resilient means provided which tend to move the first ends of the two legs apart.

Second resilient means are provided which tend to bring the knife towards the forming part.

A setting mechanism moves the knife away from the forming part when the first ends of the two legs are moved towards each other.

A locking mechanism keeps the first ends of the two legs close together when they are in the rest position and keeps the knife away from the forming part and a double-action release mechanism, when the tool is operated, firstly releases the first resilient means progressively, then also releases the second resilient means progressively.

Other characteristics and advantages of the invention will become apparent from the accompanying claims and from the description hereinbelow of an embodiment given by way of an example.

This description will be made with reference to the drawing in which the single FIGURE is a partically cutaway profile view of a tool in accordance with the invention.

DESCRIPTION OF THE PREFERRED EMBODIMENT

In the tool shown in the FIGURE there can be seen a first leg 1 ending on one side in a grip 2 and on the other side in an end 3 which is referred to as a free end. A second leg 4 has one end pivoted on the first leg at a point 0 and has its other end 5 free and at the same distance from the point 0 as the end 3 of the first leg 1. A spring blade 6 is disposed between the free end 3 of the leg 1 and that end of the leg 4 which is next to the pivot point 0. The spring blade 6 tends to separate the two free ends 3 and 5 of the two legs 1 and 4. It bears against one of the legs by means of a calibration screw 7. A rounded forming part 8 whose convex surface is used for curving the optical fibre is fixed to the free end 3 of the first leg 1 so that its convex surface is perpendicular to the plane of the two legs 1 and 4 and facing away from the pivot point 0. Two clips 9 and 10 are installed on the free ends of the legs 1 and 4 on either side of the forming point 8, one on the free end 3 of the first leg 1, the other on the free end 5 of the second leg 4. They open tangentially to the convex profile of the forming part. They grip the fibre on either side of the forming and transmit the tensile stress of the leaf spring 6 thereto, thereby part 8 pressing the fibre against the convex profile of the forming part 8. They are each constituted by respective clamps 11 and 12 urged by a spring 38, against respective bearing surfaces 13 and 14 disposed in the extensions of the convex profile of the forming part 8.

Each of the clamps 11 and 12 is held above its bearing surface by a respective pin 15 or 16 offset on one side towards the forming part. Due to this offset, each clamp acts like a wedge with respect to any sliding of the fibre caused by the traction exerted on it by the spring 6 via the free ends of the legs 1 and 4, and this gives it a clamping force proportional to the longitudinal traction exerted on the fibre. Combs 36 and 37 are placed at the outer ends of the bearing surfaces 13 and 14 respectively, for accurate positioning of the optical fibre between their teeth. A moveable knife 17 is disposed above, the convex profile of the forming part 8, it faces the surface and extends across it. It is fixed to the end of a rod 18 which slides inside the first leg 1. A draw spring 19 is fixed between the other end of the rod 18 and the end of a calibration screw 20. This screw is fixed in a bracket 21 which is integral with the first leg 1 and disposed in the line of the rod 18. The draw spring 19 urges the knife 17 towards the forming part 8 by means of the rod 18.

A setting mechanism is constituted by two bevelled blocks 22 and 23 disposed facing each other (the block 22 being fixed to the rod 18 and the block 23 being fixed to the second leg 4). The setting mechanism moves the knife 17 away from the forming block 8 when the free ends 3 and 5 of the legs 1 and 4 are brought close together. For this purpose, while the legs 1 and 4 are moving towards each other, the bevelled block 23 bears by an inclined surface under the bevelled block 22 which it pushes back in the direction of the free end 3 of the first leg 1. The setting mechanism co-operates with a locking mechanism which keeps the knife 17 away from the forming part 8 and which is formed by a block 24, a trigger 25 and a return spring 26. The block 24 is fixed on the rod 18 near the draw spring 19. The trigger 25 is installed in the first leg 1 near the grip 2. It is constituted by a two-arm lever which pivots on a pin C integral with the first leg 1 and which presses by one of its arms against the block 24 so as to oppose the force exerted on the rod 18 by the draw spring 19. The return spring 26 is attached between the first leg 1 and the second arm of the lever which constitutes the trigger 25 so as to keep this trigger pressed against the block 24. The geometrical disposition of the fixing points of the return spring 26 in relation to the pin C of the trigger 25 is such that the moment of the force exerted by the return spring 26 is sufficient to counteract the action of the draw spring 19 when the knife 17 is moved away from the forming part 8, but decreases without changing direction as the knife 17 comes nearer to the forming part 8 until it has very little effect on the rod compared to that of the draw spring 19.

A trigger lever 27 pivots at A on the grip 2 in the extension of the second leg 4. The second leg 4 is itself covered except at its free end, by a backing-arm 28 which is fixed like it to the first leg 1 by the articulation pin 0. A compression spring 29 is placed between the grip 2 and the trigger lever 27 and tends to move the latter away from the grip 2.

The trigger lever 27 extends on the same side as the second leg 4 and as the backing-arm 28 by a detent 30 which, together with a facing stop notch 31 disposed on the backing-arm 28, constitutes a locking mechanism which holds the second leg 4 close to the first when the trigger lever 27 is not actuated. The detent 30 is extended by an inclined surface 32 which, in co-operation with the ridge of the stop notch 31, allows progressive release of the second leg 4 when the lever 27 is pressed against the grip 2. This lever 27 also includes a lug 33 by means of which it presses on the trigger 25 when it is actuated, thus causing progressive release of the block 24 and consequent motion of the knife 17 towards the forming part 8.

The cutting tool is used as follows:

Firstly, the tool is set by the operator who clamps the two legs against each other by pressing on the back of the first leg 1 and of the backing-arm 28 while leaving the lever 27 free. This movement causes the knife 17 to move away from the forming part 8 and the lever 27 to return to its "open" position while the detent 30 engages the stop notch 31 and simultaneously the trigger 25 also returns to a rest position.

Once he has set the tool, the operator lays the optical fibre between the knife 17 and the forming part 8, passing through the clips 9 and 10 (which he opens by means of the levers 34 and 35 provided for this purpose) and through the positioning combs 36 and 37.

He then squeezes the trigger lever 27, thereby releasing the detent 30 from the stop notch 31 and progressively releasing the second leg 4 which, under the action of the springs, then exerts a tensile stress on the fibre via the clips. The fibre is simultaneously pressed against the convex profile of the forming part 8, thereby acquiring required bend. Squeezing the trigger lever 27 also causes the trigger 25 to be rotated and releases the knife 17 which moves towards the forming part 8 and towards the optical fibre, which it scores, thus starting to break it. When the fibre breaks, the legs 1 and 4 move as far apart as possible.

When the operator releases the trigger lever 27 after the fibre has broken, the knife 17 remains pressed against the forming part 8 and the legs 1 and 4 which are then in the open position.

This tool is easy to use, since once the fibre is in place, operation is reduced to moving a single lever. Use is further facilitated while the optical fibre is being positioned and while it is being removed by the fact that the tool is then inert. When the trigger lever is moved, the operator has no effect on the intensity of the tensile stresses exerted on the fibre nor on the pressure of the knife nor the radius of curvature imposed on the fibre, thus ensuring clean cuts and preventing damage to the fibre and to the knife.

Without going beyond the scope of the invention, some dispositions can be modified and some means can be replaced by equivalent means. In particular, the tool does not need to include the backing-arm 28; the stop notch 31 could be formed directly in the second leg 4.

We claim:

1. A hand tool for precise severing of an optical fibre, said tool comprising:

two articulated legs having first, free ends at the same distance from their pivot point said first ends being close together in a rest position and being movable apart when the tool is operated;

a forming part for bending the optical fibre, said part having a convex profile and being installed at the first end of one of the legs so that its convex surface is perpendicular to the plane of the two legs and faces away from the pivot point of these legs;

one clip on each arm and installed on either side of the forming part, in the extension of the convex profile thereof, each arm being on the first end of the corresponding leg and said clips mounted for gripping the optical fibre on either side of the forming part;

a moveable knife disposed on the first end of one of the legs, facing the convex profile of the forming part and extending thereacross;

first resilient means for moving the first ends of the two legs apart;

second resilient means for tending to bring the knife towards the forming part;

a setting mechanism for moving the knife away from the forming part when the first ends of the two legs are moved towards each other;

a locking mechanism for keeping the first ends of the two legs close together when they are in the rest position and for keeping the knife away from the forming part; and a double-action release mechanism which, when the tool is operated, firstly releases the first resilient means progressively and then also releases the second resilient means progressively.

2. A tool according to claim 1, wherein the knife is fixed to the end of a rod which slides inside one of said first legs.

3. A tool according to claim 2, wherein the setting mechanism comprises two bevelled blocks, one block being fixed to the rod and the other block being fixed to the second leg which, by pressing against each other when said first ends of the two legs move towards each other, move the knife away from the forming part.

4. A tool according to claim 2, wherein the second resilient means comprises a draw spring attached firstly to the end of the rod which is opposite to that which carries the knife and secondly to a calibration screw fixed to the first leg in the extension of the rod.

5. A tool according to claim 1, wherein one of the legs extends on the opposite side to that of its first end by a grip fitted with a trigger lever which moves the other leg, which is fixed by an articulation in the extension of the other leg and is held apart from the leg by a spring.

6. A tool according to claim 5, wherein the locking mechanism includes a detent which extends the trigger lever and co-operates with a stop notch formed in the other leg, said detent engaging in the stop notch when the first ends of the legs have been brought close together and the trigger lever has been released and keeping the legs close together.

7. A tool according to claim 2, wherein the locking mechanism comprises a block fixed to the rod which supports the knife, a trigger which pivots on a pin which is integral with the first leg and which presses under the block so as to push the rod back to keep the knife apart from the forming part and a return spring which presses the trigger against the block.

8. A tool according to claim 7, wherein said double action release mechanism comprises firstly an inclined surface placed at the end of the detent which co-operates with the edge of the stop notch when the trigger lever is pressed to release the first resilient means progressively, moving the legs apart and secondly a lug placed on the trigger lever which, when the latter is pressed, exerts on the trigger a force opposed to that of the return spring and progressively releases the second resilient means which urge the knife towards the forming part.

9. A tool according to claim 1, wherein the first resilient means comprises a calibration screw disposed between the free ends of the two legs.

10. A tool according to claim 1, wherein said clips are each formed by a wedge urged by a spring bearing against a bearing surface and held by a pin offset towards the ends of the forming part so that their clamping force is proportional to the longitudinal traction exerted on the fibre.

11. A tool according to claim 10, wherein combs for positioning the glass fibre are disposed on the free ends of the two legs outside of the clips.

* * * * *